(12) United States Patent
Altmikus

(10) Patent No.: US 10,202,963 B2
(45) Date of Patent: Feb. 12, 2019

(54) ROTOR BLADE OF A WIND TURBINE AND WIND TURBINE

(71) Applicant: Wobben Properties GmbH, Aurich (DE)

(72) Inventor: Andree Altmikus, Aurich (DE)

(73) Assignee: Wobben Properties GmbH, Aurich (DE)

( * ) Notice: Subject to any disclaimer, the term of this patent is extended or adjusted under 35 U.S.C. 154(b) by 263 days.

(21) Appl. No.: 14/897,611

(22) PCT Filed: Jun. 11, 2014

(86) PCT No.: PCT/EP2014/062100
§ 371 (c)(1),
(2) Date: Dec. 10, 2015

(87) PCT Pub. No.: WO2014/198754
PCT Pub. Date: Dec. 18, 2014

(65) Prior Publication Data
US 2016/0138563 A1    May 19, 2016

(30) Foreign Application Priority Data
Jun. 11, 2013   (DE) .......................... 10 2013 210 901

(51) Int. Cl.
*F03D 1/06*     (2006.01)
*B64C 11/18*   (2006.01)
*B64C 3/14*     (2006.01)

(52) U.S. Cl.
CPC ......... *F03D 1/0675* (2013.01); *F03D 1/0633* (2013.01); *B64C 11/18* (2013.01);
(Continued)

(58) Field of Classification Search
CPC .... F03D 1/0633; F03D 1/0675; F03D 1/0641; B64C 2003/148; B64C 11/18
See application file for complete search history.

(56) References Cited

U.S. PATENT DOCUMENTS

| 4,128,363 A | * | 12/1978 | Fujikake | F01D 5/145 416/175 |
| 8,777,580 B2 | * | 7/2014 | Eisenberg | F03D 1/0633 416/239 |

(Continued)

FOREIGN PATENT DOCUMENTS

| CN | 101711308 A | 5/2010 |
| CN | 201771673 U | 3/2011 |

(Continued)

OTHER PUBLICATIONS

DE 102010026588—Original and translation from Espacenet.*

*Primary Examiner* — Jason Shanske
*Assistant Examiner* — Behnoush Haghighian
(74) *Attorney, Agent, or Firm* — Seed Intellectual Property Law Group LLP

(57) ABSTRACT

A rotor blade of an aerodynamic rotor of a wind turbine, comprising: at least a first and a second wing fence, with the first wing fence being arranged at the rotor blade in radial direction, in relation to an axis of rotation of the rotor, in a range between 25% and 40%, and the second wing fence being arranged at the rotor blade in radial direction, in relation to an axis of rotation of the rotor, in a range between 45% and 60%.

13 Claims, 12 Drawing Sheets

(52) U.S. Cl.
CPC ...... *B64C 2003/148* (2013.01); *F03D 1/0641* (2013.01); *F05B 2240/30* (2013.01); *Y02E 10/721* (2013.01)

(56) References Cited

U.S. PATENT DOCUMENTS

| | | |
|---|---|---|
| 9,039,381 B2 * | 5/2015 | Grife .................... F03D 1/0675 |
| | | 416/236 R |
| 9,140,233 B2 * | 9/2015 | Watts .................... F03D 1/0633 |
| 2011/0211966 A1 | 9/2011 | Watts et al. |
| 2012/0051936 A1 | 3/2012 | Eisenberg |

FOREIGN PATENT DOCUMENTS

| | | | | |
|---|---|---|---|---|
| CN | 102536632 | A | 7/2012 | |
| CN | 103089536 | A | 5/2013 | |
| DE | 10347802 | B3 | 5/2005 | |
| DE | 102010026588 | A1 * | 1/2012 | ........... F03D 1/0641 |
| EP | 2466122 | A2 | 6/2012 | |
| RU | 2068116 | C1 | 10/1996 | |
| UA | 54702 | A | 3/2003 | |
| WO | 2011097024 | A1 | 8/2011 | |
| WO | 2012122262 | A2 | 9/2012 | |
| WO | 2013020959 | A1 | 2/2013 | |
| WO | 2013060722 | A1 | 5/2013 | |

* cited by examiner

ROTOR BLADE OF A WIND TURBINE AND WIND TURBINE

BACKGROUND

Technical Field

The present invention relates to a rotor blade of a wind turbine. The present invention moreover relates to a wind turbine.

Description of the Related Art

Wind turbines are a matter of common knowledge. The most common wind turbines nowadays are the so-called horizontal axis wind turbines, which are also the subject of the present application. Modern wind turbines are adapted to the wind conditions expected at their installation site. One can differentiate, in particular, between wind turbines for strong wind sites and wind turbines for weak wind sites. Further subcategorization is possible, if necessary.

As compared to wind turbines for sites with higher average wind speeds, wind turbines for weak wind sites feature longer rotor blades that are more delicate, at least section-wise. This way, such longer rotor blades can over-sweep a larger disk area and extract as much energy from the wind as possible, even in weak wind conditions. Heavy loads caused by strong wind are comparatively rare.

When building such rotor blades, one must make sure to design especially their central area narrow enough to make them as light as possible but provide them, at the same time, with sufficient load capacity for the blade. Especially in the area of the rotor blade that is central in relation to the radial direction of the rotor, it can be difficult to accommodate the described requirements on stability and load capacity of the rotor blade to the required aerodynamic design.

Sometimes, the scope for designing the aerodynamic profile may be so little that, although one will achieve an aerodynamic profile with good properties, slight deviations of this ideal aerodynamic profile may have a significant effect on the flow properties. Especially contamination of the rotor blade may cause an unwanted early stall that would not, or at least not to that extent, happen with a non-contaminated blade. Sometimes, even raindrops can cause a significant contamination of the blade.

BRIEF SUMMARY

One or more embodiments of the invention improve upon the aerodynamic properties of a rotor blade. In particular, one embodiment improves a rotor blade of a wind turbine for weak wind sites and, in particular, makes it less prone to contamination.

The German Patent and Trademark Office has researched the following prior art in the priority application to the present PCT application: DE 103 47 802 B3, US 2011/0211966 A1, US 2012/0051936 A1 and EP 2 466 122 A2.

One embodiment is directed to a rotor blade of an aerodynamic rotor, comprising at least one first wing fence and one second wing fence. The position of said wing fences is specifically aligned to an area that is central in relation to a radial direction of the aerodynamic rotor. The position of the at least two wing fences is selected such that said wing fences enclose a central area of the rotor blade.

This is based on the consideration that the rotor blade even of weak wind installations, i.e., of wind turbines for weak wind sites, may have a wide design in the area close to the hub and allow for a less vulnerable profile. A more robust profile design may be also performed in the outer area, i.e., in the area facing towards the rotor blade tip, because here in this outer area the load capacity of the rotor blade does not depend so much on the blade design. In the central area, the load capacity of the rotor blade plays a major role and the wind's influence on the output of the wind turbine is still quite strong in this area. Also, contamination caused, for example, by rain may have a greater influence in the central area, because the rotational speed is not that high here as in the outer area of the blade and rainwater can thus better stick to the surface.

Notably the use of wing fences in rotor blades of wind turbines is known. In this context, reference is made to German Patent DE 103 47 802 B3. Said patent provides for wing fences to prevent cross-flows between an essentially cylindrical root area of the rotor blade and the outer portion of the rotor blade having an aerodynamic profile. To this end, a wing fence is proposed in the area where the rotor blade transitions from its cylindrical root area to the area featuring an aerodynamic profile. A second wing fence may be provided for support purposes.

One or more embodiments of the present invention, on the other hand, relates to a completely different problem, namely to preventing, or at least limiting to a predetermined area, a stall caused, in particular, by blade contamination. One or more embodiments of the invention relates, in particular, to rotor blades having their largest profile depth directly in their root area for attaching to a rotor hub. In other words: the present invention relates, in particular, to rotor blades having an aerodynamic profile along their entire axial or radial length, respectively.

In this context, it is proposed for the first wing fence to be arranged in a range of 25% to 40% and for the second wing fence to be arranged at the rotor blade in a range of 45% to 60%. These details relate to the radial direction of the rotor blade when used as intended in the aerodynamic rotor of the wind turbine. This means that a value of 0% would be exactly at the rotation axis of the aerodynamic rotor and a value of 100% would be at the rotor blade tip of the rotor blade.

Preferably, the first wing fence is arranged in a range of 30% to 35% in radial direction and, in addition or alternatively, the second wing fence is arranged at the rotor blade in radial direction in a range of 50% to 55%. This provides the correspondingly concrete central area of the rotor blade with said two wing fences that enclose said central area. The proposed measure can thus focus specifically on this central area.

The first and the second wing fence is preferably arranged at the suction side of the rotor blade. It was found, in particular, that this is where most of the problems relating to a stall can occur, so that the wing fences are provided here, in particular. Preferably, the suction side of the rotor blade features not only a wing fence on each side, but each wing fence features also two fence sections, one of which is arranged at the suction side, and the other one of which is arranged at the pressure side of the rotor blade. Here, it was found that the proposed aerodynamic measure can be even improved when supporting the wing fence of the suction side by a fence section at the pressure side. This way, any stall phenomena can be limited even more effectively to this central area of the rotor blade.

According to one embodiment, each wing fence is designed such as to increase in terms of height from the blade nose to the rear edge. This means that the basis is a common rotor blade featuring a blade nose or rotor blade nose approximately in the direction of motion and a rear edge facing away from the blade nose, i.e., facing backwards, basically. Preferably, the height of the wing fence is geared to the thickness of the boundary layer of the air blowing against the blade. Said boundary layer is assumed as the area where the oncoming air speed has such a great distance to the blade's surface that it has reached 90% of the undiminished air flow speed. Here, the flow speed of the air relative to the rotor blade at the respective point is taken as a basis.

It has now transpired that said boundary layer has an increasing distance from the blade nose to the rear edge. According to one embodiment, it is proposed that the height of the wing fence should be geared thereto.

The considerations relating to the height of the wing fence assume a wing fence that is configured, for example, as a flat object that is realized vertical to the blade surface and lengthwise to the angle of incidence, i.e., that is approximately bridge-shaped. These details are moreover to be also applied to wing fence sections—also simply referred to as fence sections—if the wing fence features a fence section on the suction side and one on the pressure side.

The wing fence starts, in particular, close to the blade nose, e.g., in relation to a cord of the blade profile at the respective point at 5% to 10% behind the blade nose. Here, the wing fence or the fence section, respectively, starts out at a low height of 0 to 5 mm and then continuously increases up to a height of more than 15 mm, in particular more than 20 mm. In case of the first wing fence or its fence sections, respectively, said elevation can increase to more than 30 mm. Preferably, the wing fence will remain unchanged in terms of height—namely evenly high—in its rear area, in particular in its rear third. This way, it can adapt to the position of the boundary layer to thus avoid unnecessarily great heights and hence unnecessary contact surfaces and to ultimately save material as compared to a variant with consistently great height.

This means that each wing fence or fence section, respectively, is preferably designed as a bridge that features a base section and a rear section. The bridge is attached to the rotor blade surface—i.e., to the suction side or pressure side—with the base section, and the other, free side of the bridge is formed by the rear section. The base section thus follows the blade profile. The rear section is also designed as the blade profile, but in a different position. To this end, a contour line is assumed that in terms of its shape equals the blade profile, but is twisted/rotated by a pivot/rotation axis in relation to the blade profile. These approaches assume a section in the area of the respectively examined wing fence. So, what is assumed here, at first, is a contour line that follows the blade profile e.g., at the suction side. What is then applied, theoretically, is an axis of rotation, preferably in the area of the blade nose. Said contour line is then rotated —theoretically—about said axis of rotation, in particular at an angle of approximately 1° to 3°, so that said contour line has a common point with the blade profile in the axis of rotation, while otherwise continuously moving away from the blade profile, i.e., from the suction side in this example, backwards towards the rear edge. The wing fence or wing fence section, respectively, thus runs between the blade profile and said rotated contour line.

Accordingly, when a fence section is provided at the pressure side, the contour line of the pressure side is taken as a basis to form the course of the basis of the bridge, while the contour line rotated towards it forms the course of the rear of the bridge. Here, the direction of rotation about the same axis is exactly reverse compared to the design of the wing fence on the suction side.

In the front area facing towards the blade nose, i.e., in particular in a range of 5% to 10% in relation to the cord of the blade, the height of the bridge would be so low as to make the bridge redundant, and it would suffice if the bridge started only at a corresponding distance to the blade nose. This applies to both the suction side and the pressure side.

Preferably, the height of the wing fence will be geared to between two and five times, in particular three and four times, the size of the displacement thickness of the boundary layer in the corresponding area.

It was moreover found that a low height of the wing fence towards the blade nose may suffice, as stalls that are to be prevented by the proposed measure occur only in the central or even rear area of the blade or of the blade profile, respectively. Therefore, a greater height of the wing fence with increasing position towards the rear edge is advantageous.

Yet another embodiment proposes that the first and second wing fences should have different heights, in particular different mean heights. In as far as the wing fences are designed as a bridge with a bridge back that follows the rotated profile line, the height of the first wing fence will be greater than that of the second wing fence over the entire length of the bridge. For comparison purposes, a mean height of the two wing fences is simply taken as a basis, which may be, for example, an arithmetic mean of the height of the course of the respective wing fence. If the wing fence features a fence section also on the pressure side, such considerations and descriptions are to be applied analogously to the height of the respective fence section.

What is proposed in any event is for the first wing fence, i.e., the one arranged closer to the rotor hub, to be at least 30%, in particular at least 50%, higher than the second wing fence. Here, it was found that a lower height is sufficient for the outer wing fence, which may be advantageous in terms of aerodynamics.

Preferably, vortex generators are provided in addition. Such vortex generators, which are arranged approximately in the first third towards the blade nose and located preferably on the suction side of the rotor blade, can counteract a release effect, i.e., a stall at the blade profile. They can, in particular, cause a position of such a stall to shift more towards the rear edge, which will at least reduce the aerodynamic disadvantages caused by the stall. If said stall can be—theoretically—shifted to the rear edge, it will practically cease to occur.

Preferably, it is proposed for said vortex generators to be arranged only between the first and second wing fences. Their effect is thus limited to this area and is also shielded towards the outer or inner area, respectively, of the rotor blade by the wing fences. What is also addressed here, in particular, is the problem that such vortex generators may constitute an unwanted source of noise. By arranging them only in this area between the two wing fences, the level of noise can be also reduced by avoiding/being able to avoid an occupancy with vortex generators that is unnecessarily vast in radial direction.

The rotor blade is preferably designed for a weak wind installation, i.e., for a wind turbine intended for a weak wind site. This means that the proposed solutions address, in particular, a problematic central area of such a rotor blade of a weak wind installation.

Preferably, the invention is based on a rotor blade having its greatest profile depth directly at its blade root for attaching to the rotor hub. It hence does not make use of a rotor blade that becomes slimmer towards the hub and that features an essentially cylindrical area that is not designed as a blade profile. In other words: the present solutions do not relate to effects occurring between a profile area of the rotor blade and an unprofiled area of the rotor blade, namely a cylindrical blade root.

What is moreover proposed according to an embodiment of the invention is a wind turbine having one or more rotor blades according to at least one of the above-described embodiments. What is proposed, in particular, is a wind turbine having three rotor blades, each of which is designed as proposed by one of the above embodiments.

One preferred rotor blade of a wind turbine features a rotor blade root for connecting the rotor blade to a rotor hub and a rotor blade tip arranged at the side facing away from the rotor blade root. Here, a relative profile thickness, which is defined as the profile thickness to profile depth ratio, shows a local maximum in a central area between rotor blade root and rotor blade tip. Hereinafter, profile depth shall mean the length of the profile, i.e., the distance between leading edge and trailing edge. Profile thickness means the distance between upper and lower profile side. The relative profile thickness thus shows a lower value if the profile thickness is small and/or the profile depth is large.

The relative profile thickness shows a local maximum between rotor blade root and rotor blade tip. The local maximum is located in the central area between rotor blade root and rotor blade tip, preferably in a range between 30% and 60% of the total length of the rotor blade, measured from the rotor blade root to the rotor blade tip. So, if the total length is, for example, 60 meters, the local maximum will be in a range of preferably 18 meters to 36 meters. This means that the relative profile thickness will first decrease starting from the rotor blade root and will then increase in the central area until it again reaches the local maximum, namely up to a point in the surroundings of which the relative profile thickness does not show a higher value. The local maximum in the central area of the rotor blade is formed, in particular, when the profile depth decreases noticeably from the rotor blade root to the central area. At the same time, or alternatively, the profile thickness can be increased or it can decrease not quite as noticeably as the profile depth. This results in material savings, in particular between the rotor blade root and the central area, and thus in weight saving. The increase in profile thickness leads to great stability of the rotor blade.

It was found that a decrease in profile depth in the central area may result in reduced load capacity, but at the same time also in a reduction of the weight of the rotor blade. A possible decline in the efficiency of the rotor blade is accepted in order to achieve a lower weight. The focus in the central area is more on stability and stiffness with an as good as possible efficiency, while the focus in the outer area is more on high efficiency. What is thus proposed is a profile whose profile depth decreases at least less noticeably from the central area outwards towards the rotor blade tip than in the central area.

Preferably, the relative profile thickness of the local maximum is 35% to 50%, in particular 40% to 45%. The relative profile thickness will normally start at the rotor blade root at a value of 100% to 40%. A value of about 100% means that the profile thickness is about the same as the profile depth. Thereafter, the value will decrease monotonically. In one embodiment according to the invention, the value will first decrease starting from the rotor blade root until it reaches a local minimum. After having reached a local minimum, the relative profile thickness will increase until it reaches about 35% to 50%.

In a preferred embodiment, the rotor blade has a profile depth between 1500 mm and 3500 mm, in particular about 2000 mm, in the central area and/or in the area of the local maximum. If the rotor blade shows a profile depth of about 6000 mm in the area of the rotor blade root, the profile depth will hence decrease by approximately one third towards the central area and/or towards the area of the local maximum.

The rotor blade is preferably designed for a tip speed ratio in a range between 8 and 11, preferably between 9 and 10. The tip speed ratio is defined as the ratio of the peripheral speed at the rotor blade tip to the wind speed. High design tip speed ratios along with a high power coefficient can be reached by using lean, quickly rotating blades.

In yet another embodiment, the rotor blade features in a range of 90% to 95% of the total length of the rotor blade, as measured from the rotor blade root to the rotor blade tip, a profile depth that equals about 5% to 15%, in particular about 10% of the profile depth in the area of the rotor blade root.

Such reduced profile depth in the area of the rotor blade tip will also reduce the loads, in particular aerodynamic loads, that act on the machine structure and tower. What is basically proposed is a relatively lean rotor blade.

In a preferred embodiment, the rotor blade has a profile depth of at least 3900 mm at the rotor blade root, in particular in a range of 3000 mm to 8000 mm, and/or a profile depth of not more than 1000 mm, in particular in a range of 700 mm to 300 mm, in a range of 90% to 95% of the total length, in particular at 90%, based on the rotor blade root.

Preferably, the rotor blade has a profile depth in the central area, in particular at 50% of the total length of the rotor blade and/or in the area of the local maximum, that equals about 20% to 30%, in particular about 25%, of the profile depth in the area of the rotor blade root. If the profile depth in the area of the rotor blade root is, for example, 6000 mm, the profile depth in the area of the local maximum and/or in the central area will be only about 1500 mm. The result of this rapid decrease in profile depth between the rotor blade root and the central area, is a lean profile with minor loads, in particular aerodynamic loads. The loads are lesser than in other common rotor blades. With common profiles, the rotor blade depth will normally decrease linearly, in essence. As a result, there will be a higher profile depth and thus more material present especially between the rotor blade root and the central area.

What is proposed, preferably, is a wind turbine for a weak wind site with at least one rotor blade according to at least one of the above embodiments. Such a wind turbine is economically efficient thanks to its at least one and quickly rotating rotor blade, high design tip speed ratio and high power coefficient. The wind turbine is thus also particularly suited for operation in the partial-load range and/or in weak wind conditions, and thus also for inland sites. Preferably, the wind turbine features three rotor blades.

The invention is described in more detail below, using embodiments as examples with reference to the accompanying figures. The figures include schematic illustrations that have been partially simplified.

DETAILED DESCRIPTION

Figure 1:
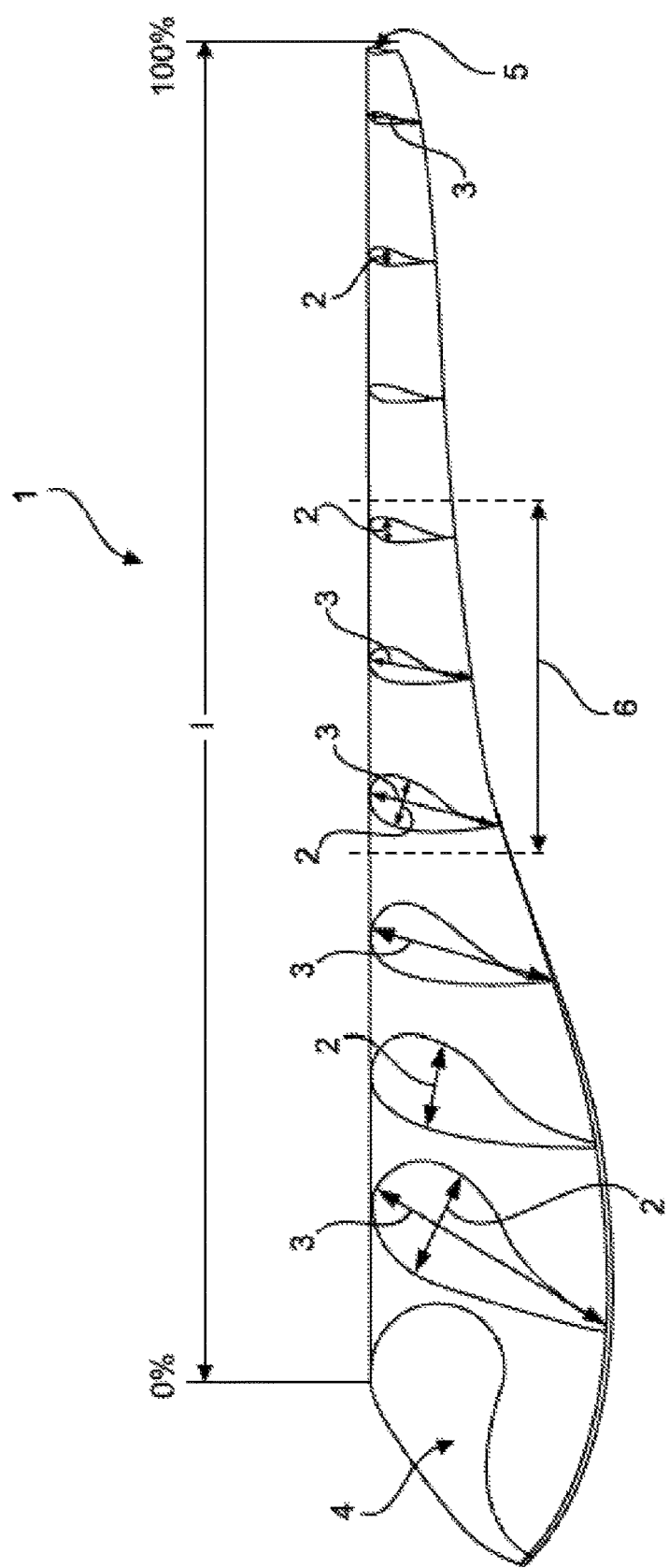
FIG. 1 shows a schematic view of a rotor blade.

FIG. 1 shows a distribution of various profile geometries of a rotor blade 1 of one embodiment. In rotor blade 1, profile thicknesses 2 and profile depths 3 are shown in sections. On one end, rotor blade 1 features rotor blade root 4, and on the other, far end it features a connection area 5 for mounting a rotor blade tip. The rotor blade has a large profile depth 3 at rotor blade root 4. Profile depth 3 is, however, much smaller in the connection area 5. The profile depth decreases noticeably starting from rotor blade root 4, which may be also referred to as profile root 4, all the way to a central area 6. A cutoff point (which is not shown in this figure) may be provided in the central area 6. The profile depth 3 remains almost steady between the central area 6 and the connection area 5. The depicted rotor blade 1 is intended for mounting a small rotor blade tip that accounts for less than 1% of the length of the depicted rotor blade 1 and therefore can be neglected here.

Figure 2:
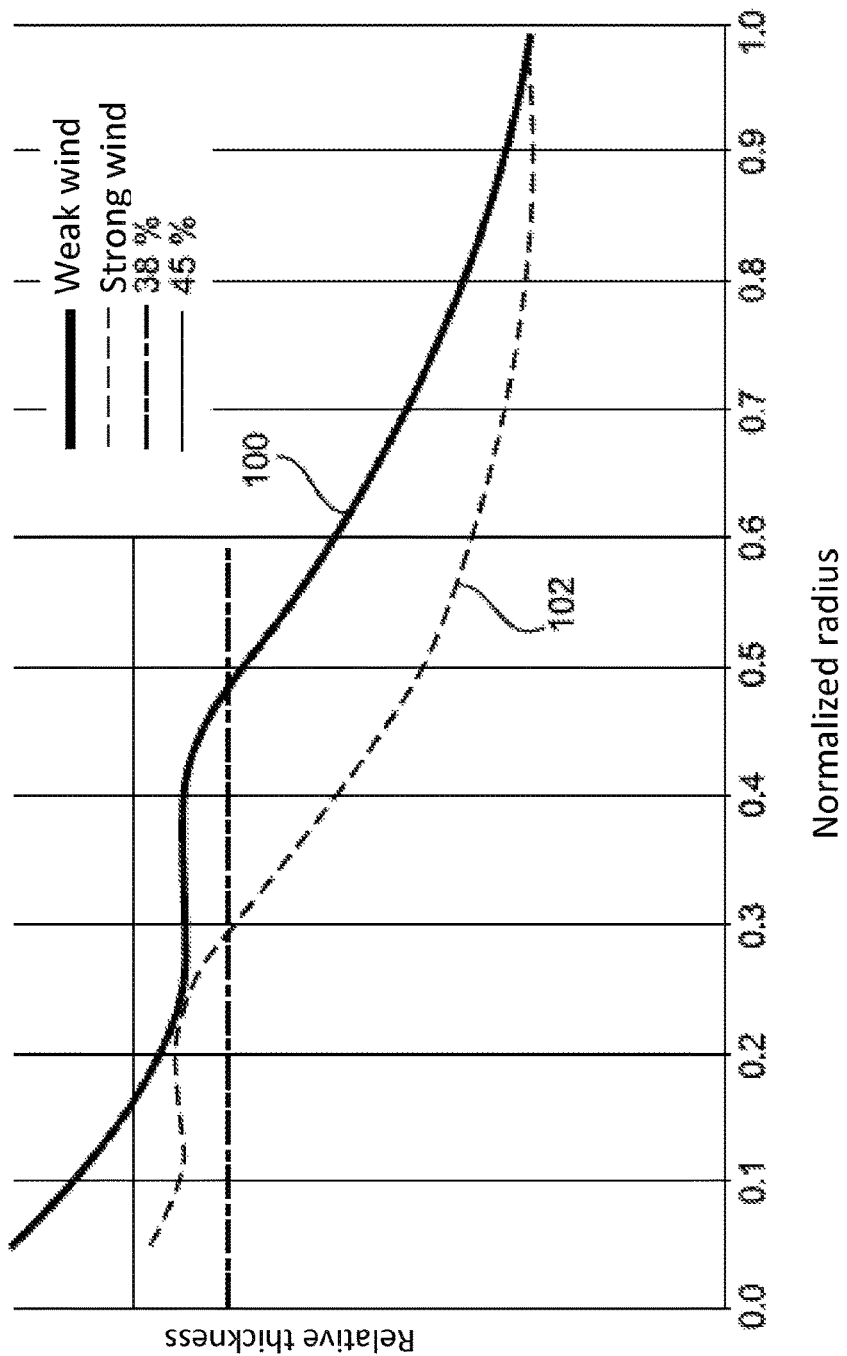
FIG. 2 shows a diagram, where the relative profile thickness is shown qualitatively above the normalized rotor radius.

FIG. 2 shows a diagram, where the relative profile thickness of two different rotor blades of a wind turbine is drawn in above the normalized rotor radius. The relative profile thickness, namely the profile thickness to profile depth ratio, may be stated in %; however, in this case the qualitative course is crucial, and therefore no values have been plotted. Only the values for 38% and 45% are drawn in for orientation purposes. The rotor radius relates to a rotor with at least one rotor blade mounted to a rotor hub of the rotor. The length of the respective rotor blade extends from the rotor blade root to the rotor blade tip. The rotor blade starts with its rotor blade root at a value of about 0.05 of the normalized rotor radius and ends with its rotor blade tip at a value of 1 of the normalized rotor radius. The value of the normalized rotor radius in the area of the rotor blade tip is about equal to the percentage length of the respective rotor blade. The value 1 of the normalized rotor radius is, in particular, equal to 100% of the rotor blade length.

The diagram shows the two graphs 100 and 102. Graph 100 represents the course of the relative profile thickness of a wind turbine for a weak wind site, and graph 102 shows the course of a wind turbine for sites with higher mean wind speeds. From the graphs, it can be seen that the course of the relative profile thickness of graph 102 is monotonically decreasing, in essence. In the area of the rotor blade root, i.e., between a normalized rotor radius of 0.0 and 0.1, graph 102 starts with a relative profile thickness of less than 45%. The values of the relative profile thickness decrease steadily.

Graph 100 of the weak wind installation starts with a clearly higher relative profile thickness. It drops below the drawn-in 45% mark of relative profile thickness only at about 15% of the normalized rotor position and leaves this area only at about 50% of the normalized radius. The difference in relative profile thickness between a weak wind installation pursuant to graph 100 and a strong wind installation pursuant to graph 102 is greatest if the normalized radial position is about 45%.

The illustration thus shows that the decrease in relative thickness in the weak wind installation is much more pronounced on the outskirts than in the strong wind installation. Especially in the range of 40% to 45%, where the relative thickness is the greatest compared to the strong wind installation, it is proposed to provide for boundary fences that can enclose this area and/or to provide for vortex generators.

Figure 3:
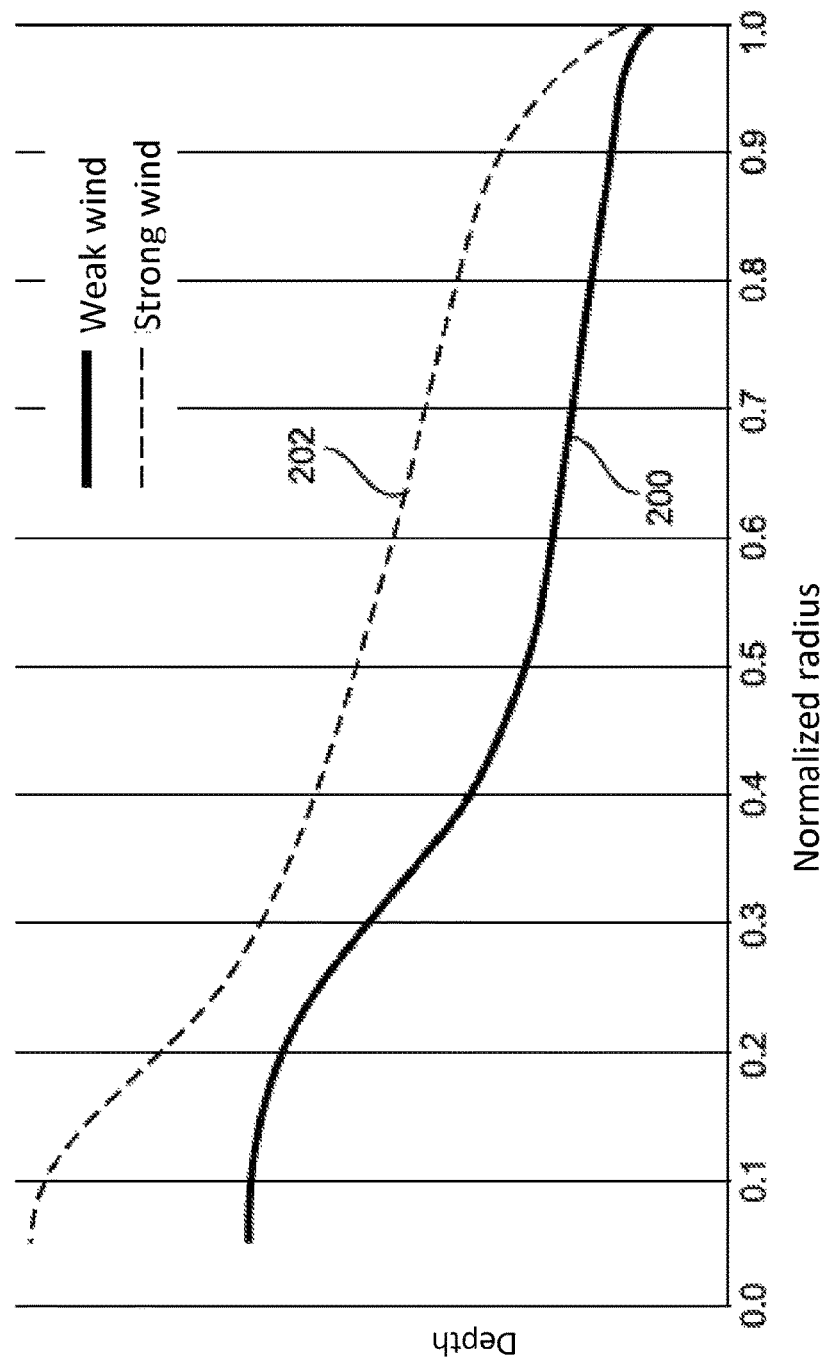
FIG. 3 shows a diagram, where the depth is shown qualitatively above the radius.

FIG. 3 shows a diagram that depicts the profile depth—referred to simply as depth in the diagram—qualitatively, subject to the rotor radius, whose value normalizes to the maximum radius of the respectively underlying rotor. Graph 200 shows the course for a weak wind installation, which was also underlying the illustration in FIG. 2, whereas graph 202 shows the course of a strong wind installation, which was also underlying FIG. 2. It can be seen therein that the weak wind installation unlike the strong wind installation shows a comparatively low depth at a very early stage, i.e., already at about 50% of the total radius.

Figure 4:
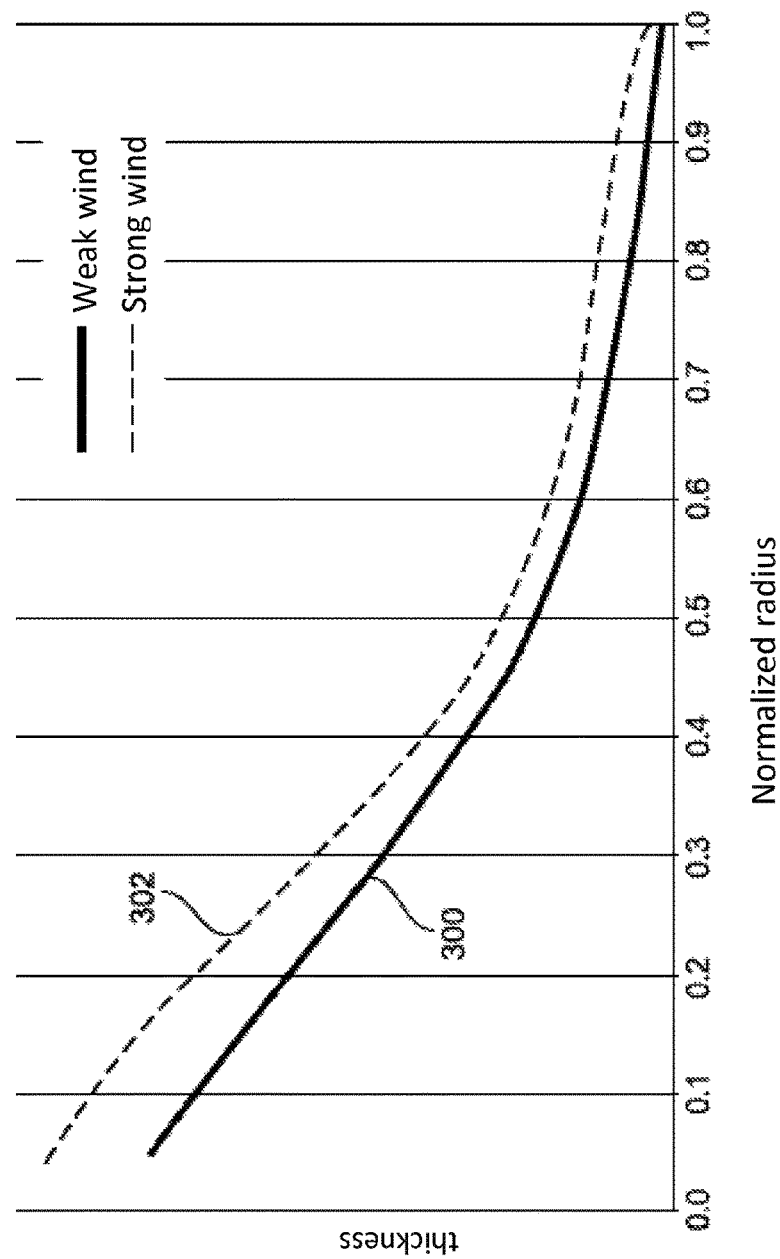
FIG. 4 shows a diagram, where the thickness is shown qualitatively above the radius.

FIG. 4 shows a diagram, where the respective profile thickness—referred to simply as thickness in the diagram—is shown for the profile depths of FIG. 3. Here, too, graph 300 for the weak wind installation and graph 402 for the strong wind installation are shown only qualitatively above the normalized radius. Graphs 100, 200 and 300, on the one hand, and graphs 102, 202 and 402, on the other, are based on one and the same wind turbine.

It can be seen that thickness profiles 300 and 302 are very similar for either wind turbine type to ensure the respective structure stability. However, a lesser depth in the outer rotor area is specified for the weak wind installation to make allowance for the special conditions, as shown by graph 200 in FIG. 3 as compared to graph 202. This results in the characteristic course of the relative thickness pursuant to graph 100 with a plateau in the range around about 40%, as shown in FIG. 2.

Figure 5:
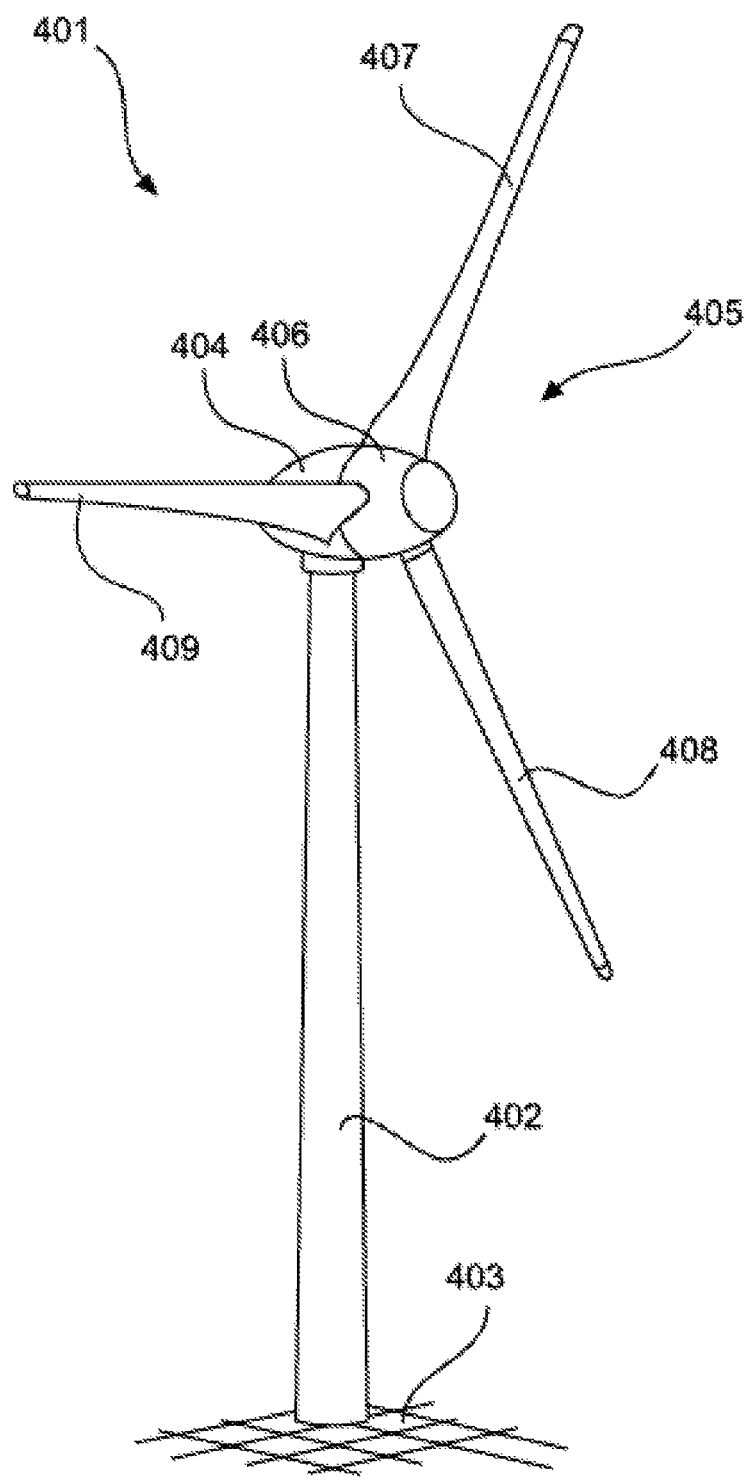
FIG. 5 shows a perspective view of a wind turbine.

FIG. 5 shows a wind turbine 400 with a tower 402 built on a base-plate 403. At the upper side opposite the base-plate 403, there is a nacelle 404 (machine house) with a rotor 405 consisting essentially of a rotor hub 406 and rotor blades 407, 408 and 409 that are attached thereto. Rotor 405 is connected to an electrical generator located inside of nacelle 404 for converting mechanical work to electrical energy. Nacelle 404 is rotatably mounted to tower 402, whose base-plate 403 provides the necessary stability.

Figure 6:
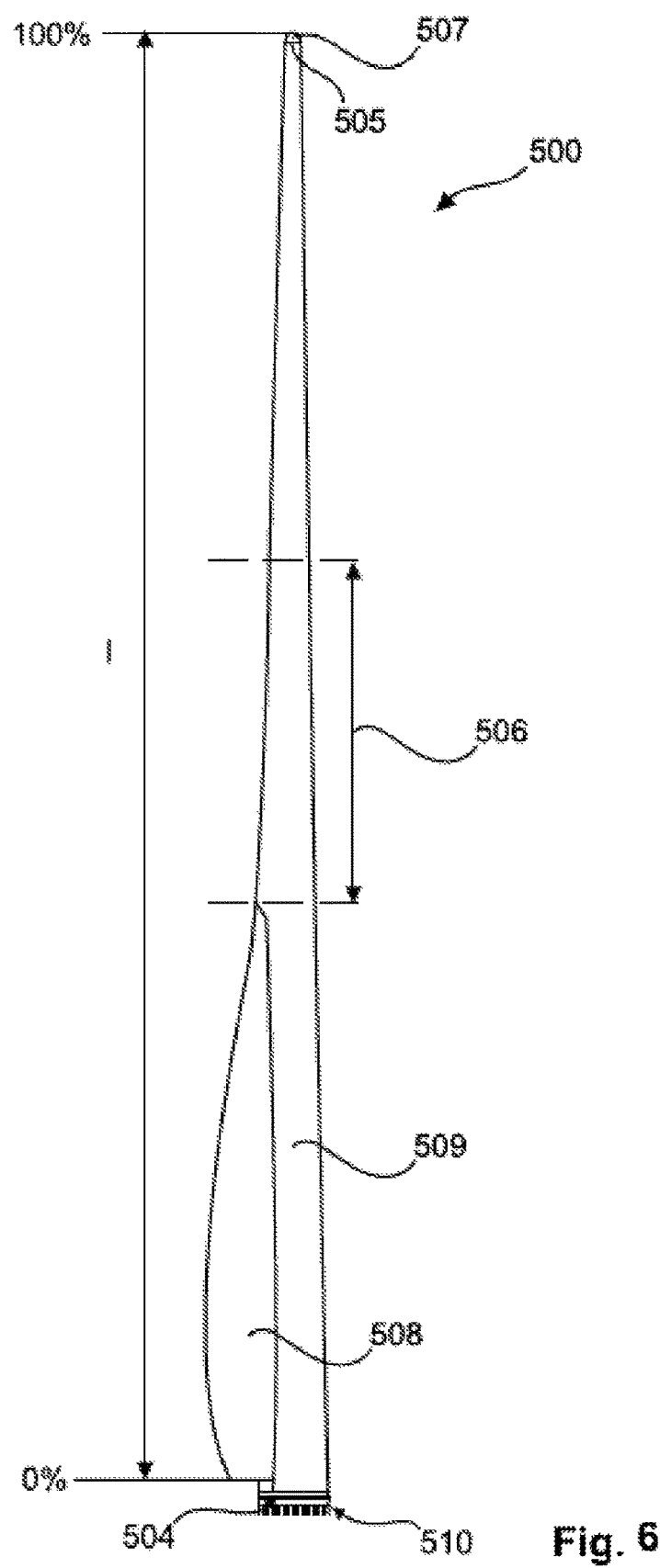
FIG. 6 shows a lateral view of a rotor blade.

FIG. 6 shows a lateral view of a rotor blade 500 of an embodiment over its entire length 1, i.e., from 0% to 100%. On one end, rotor blade 500 features a rotor blade root 4, and on the other, far end it features a rotor blade tip 507. In a connection area 505, rotor blade tip 507 is connected to the remainder of the rotor blade. The rotor blade has a large profile depth at rotor blade root 504. The profile depth is, however, much smaller in the connection area 505 and at the rotor blade tip 507. The profile depth decreases noticeably starting from the rotor blade root 504, which may be also referred to as profile root 504, all the way to a central area 506. A cutoff point (which is not shown in this figure) may be provided in the central area 506. The profile depth remains almost steady between the central area 506 and the connection area 505.

Rotor blade 500 has a split shape in the area of rotor blade root 504. Rotor blade 500 thus consists of a basic profile 509, to which yet another section 508 is arranged in the area of the rotor blade root 504 to increase the rotor blade depth of the rotor blade 500. Section 508 is, for example, glued to the basic profile 509. Such split shape is easier to handle during transportation to the installation site and is easier to produce.

What is also shown in FIG. 6 is a hub connection area 510. Rotor blade 500 is connected to the rotor hub through the hub connection area 510.

Figure 7:
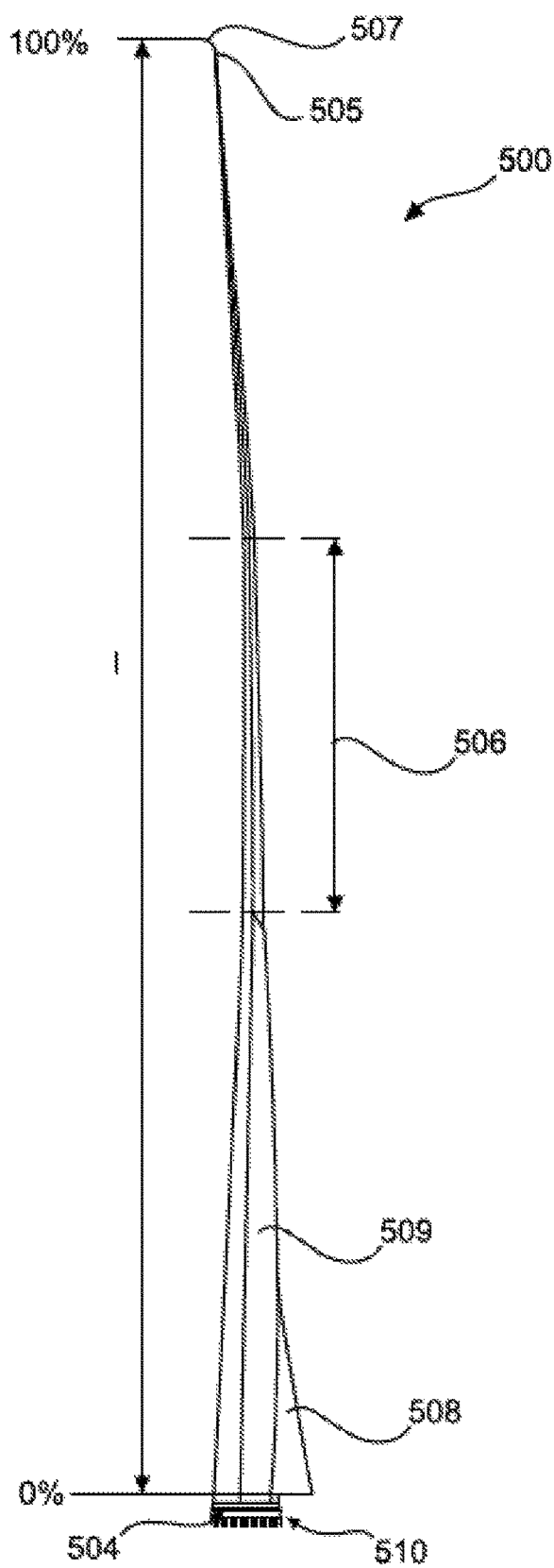
FIG. 7 shows another lateral view of the rotor blade of FIG. 6.

FIG. 7 shows yet another lateral view of the rotor blade 500 of FIG. 6. What can be seen here is rotor blade 500 with basic profile 509, section 508 to increase the rotor blade depth, central area 506, rotor blade root 504 and hub connection area 510 as well as connection area 505 for rotor blade tip 507. The rotor blade tip 507 is designed as so-called winglet to reduce vortices at the rotor blade tip.

Figure 8:
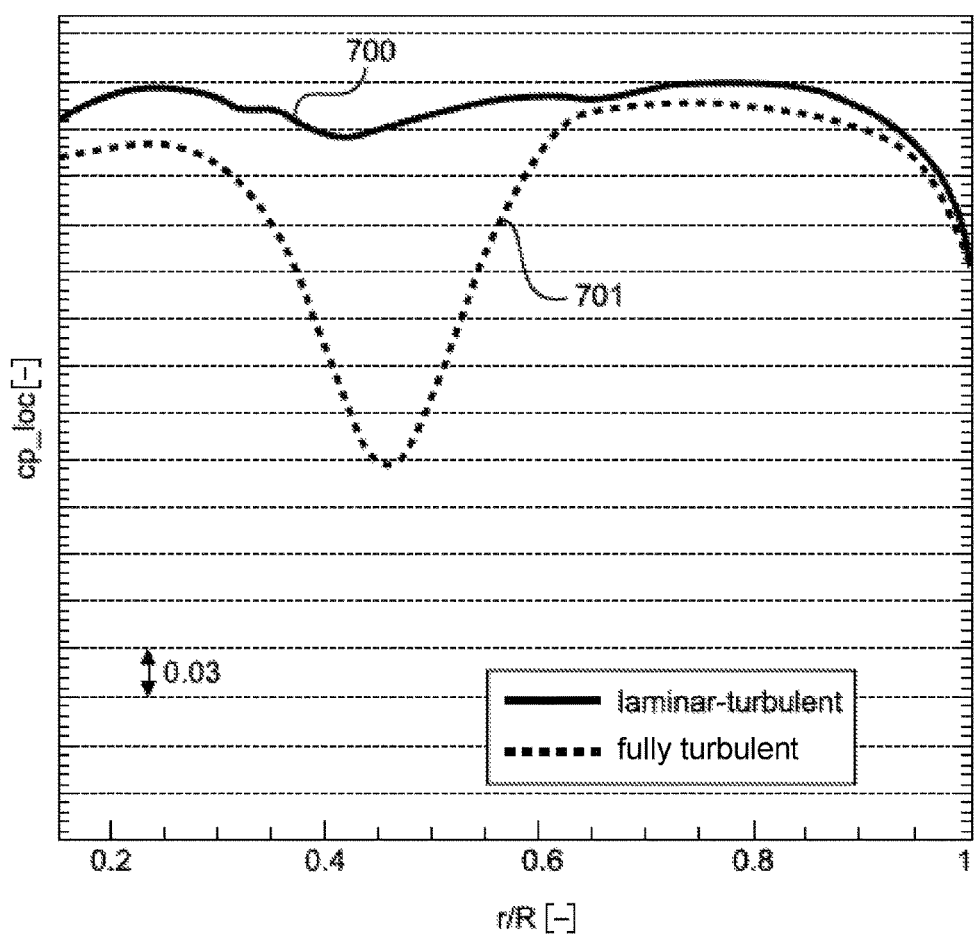
FIG. 8 shows a local power coefficient cp loc qualitatively for two conditions, depending on the radial position at the rotor blade.

FIGS. 1 to 7 illustrate a rotor blade or a wind turbine, respectively, without showing the wing fences and without showing vortex generators. FIG. 8 shows a problem that may occur with an underlying blade of a weak wind installation. The illustration shows two different courses of the local power coefficient, qualitatively plotted above the relative radius of the rotor blade, namely of the current radius r in relation to the maximum radius R of the underlying rotor. The value 1, i.e., 100%, thus corresponds to the position of the tip of the blade, while the value 0, i.e., 0%, corresponds to the axis of rotation of the underlying rotor. Since the blade does not extend to the zero point, the illustration starts approximately at 0.15. The analysis is based on a tip speed ratio of 9 ($\lambda=9$).

The two curves are simulation results of three-dimensional computational fluid dynamics. They quantitatively show the local power coefficient for two identical but unequally contaminated rotor blades. The upper curve 700 shows the result for a basically ideal rotor blade that does not, in particular, show any contamination. It is marked "laminar-turbulent" in each case. The lower curve 701 shows the result for basically the same rotor blade that is not in an ideal condition and shows contamination, such as rain or raindrops on the blade. This is referred to as "fully turbulent" in FIG. 8.

The local power coefficient may drop in case of adverse conditions in a central area of the rotor blade.

Figure 9:
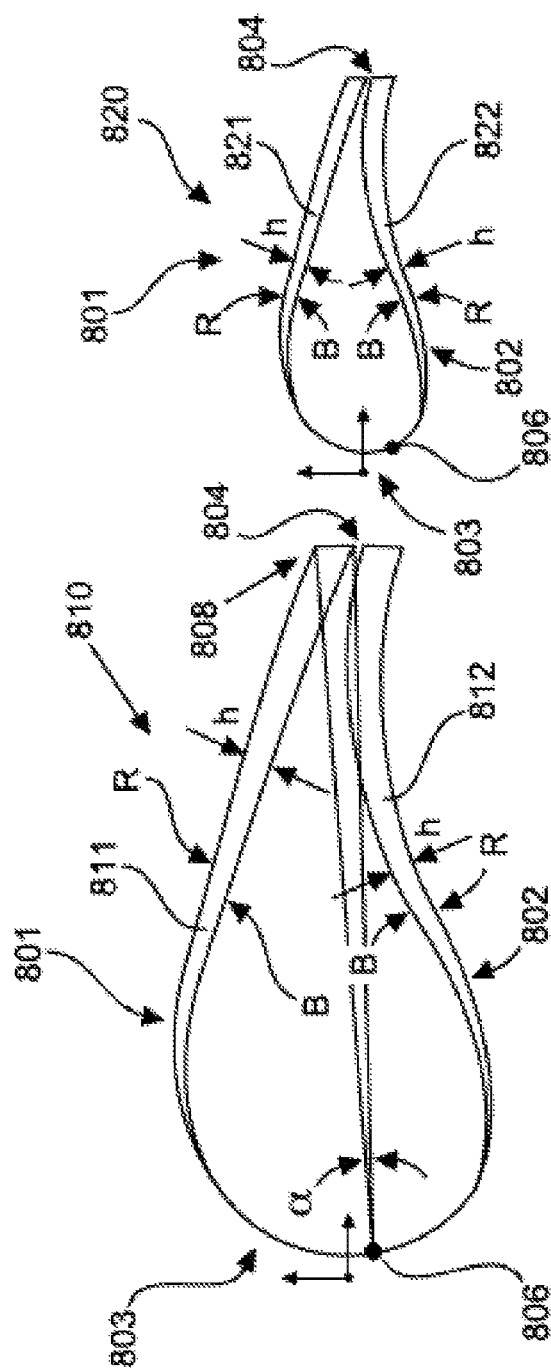
FIG. 9 shows the first and second wing fences in a rotor blade axial view.

FIG. 9 shows a first wing fence 810 and a second wing fence 820. Either one shows a suction side section 811 and 821 and a pressure side section 812 and 822. Each one of these sections 811, 812, 821 and 822 is designed as a bridge and shows a base section B and a rear section R, marked herein with the same letters for the sake of simplicity, to emphasize their functional similarity. Each base section B hence marks, at the same time, the profile of the blade in the respectively depicted section, namely for suction side 801 or for pressure side 802, respectively. All fence sections 811, 812, 821 and 822 continuously increase in height, starting from an area close to rotor blade nose 803 towards rear edge 804. Reference signs 801 to 804 are thus identical for both wing fences 810 and 820, as they relate to the same rotor blade, except that they are shown at different radial positions in the two views of FIG. 9.

FIG. 9 also shows an axis of rotation 806 for either wing fence 810 and 820, about which the pressure side contour or suction side contour, respectively, is pivoted to get the contour of the respective rear section R. This is shown only for the first wing fence 810 and there only for the suction side section 811, but it translates analogously to the pressure side section 812 and also to the wing fence 820, namely, in each case, to the suction side section 821 and the pressure side section 822.

The contour for the rear section R is thus pivoted about pivot angle a, which becomes most noticeable in the end area 808. Pivot angle a may be different for the different wing fence sections 811, 812, 821 and 822. As a result of this design, the fence sections have a height h over the respective blade surface. Height h changes along the respective bridge, i.e., it increases from blade nose 803 to rear edge 804. This means that height h varies along the respective bridge and may also be different for the various fence sections 811, 812, 821 and 822. To illustrate the functional interactions, however, variable h has been selected for every fence section 811, 812, 821 and 822.

Figure 10:
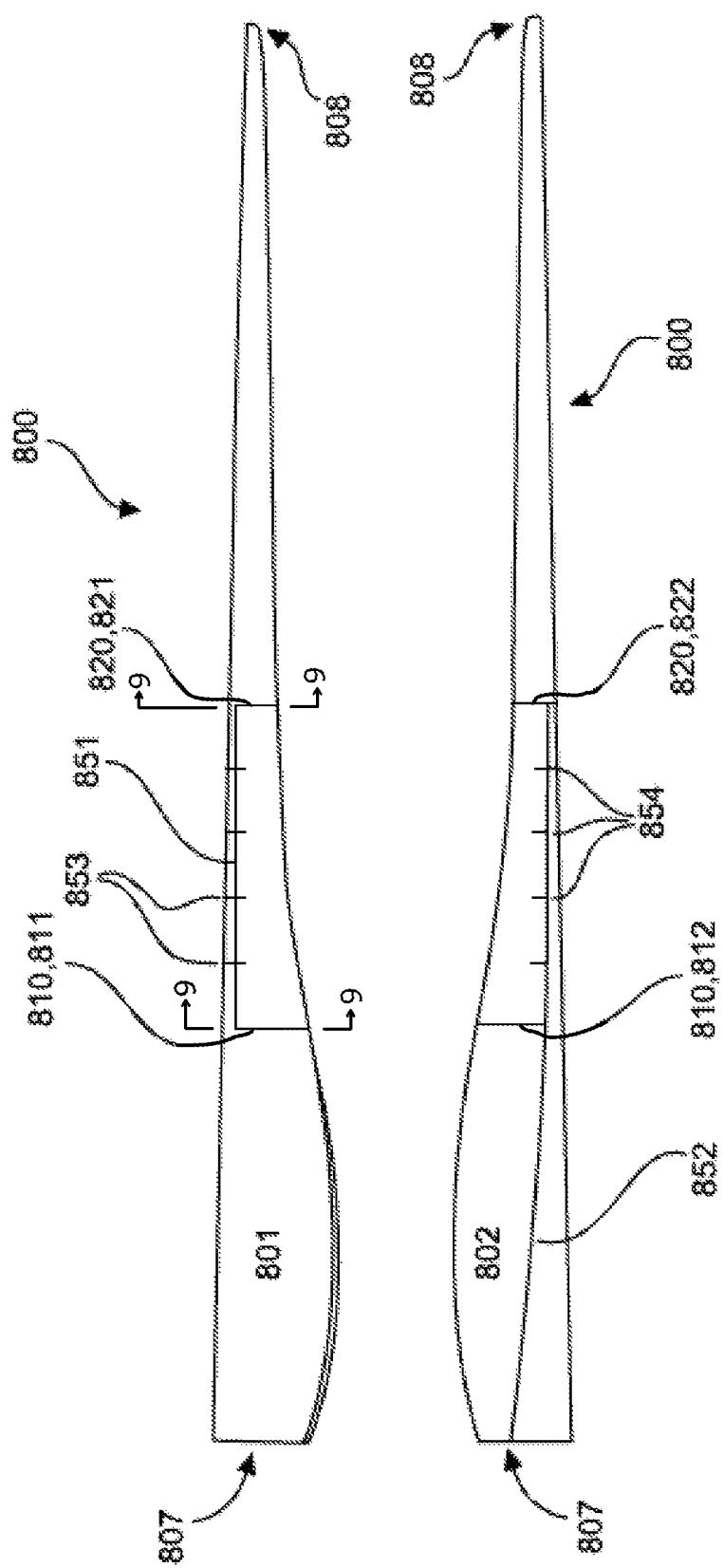
FIG. 10 shows a rotor blade from two perspectives.

FIG. 10 shows two views of a rotor blade 800, namely a top view of the suction side 801 and a top view of the pressure side 802. The rotor blade 800 is shown from the root area 807 to the tip of the blade 808, and the respective top view relates to the area of the blade tip 808. The root area 807 is pivoted in relation to the blade tip area 808, which may be up to 45° to 50°, so that the root area 807 does not seem to show the widest area, i.e., the largest profile depth, which is, however, only a phenomenon of the perspective of this pivoted area.

FIG. 10 shows the position of the first wing fence 810 and of the second wing fence 820 and thus the position of the two fence sections 811 and 821 of the suction side and of the fence sections 812 and 822 of the pressure side. The example shown is based on a rotor blade 800 of a rotor with a radius of 46 m. The first wing fence 810 is arranged at a position of 15 m in relation to the radius of the rotor, and the second wing fence 820 is arranged at a position of 25 m.

FIG. 10 moreover shows a suction-side and a pressure-side position line 851 at the suction side 801 or a position line 852 at the pressure side 802, respectively, each of which mark one line along which vortex generators 853 or 854, respectively, are to be arranged. Vortex generators 853 and 854 are likewise merely suggested and may be, in particular, provided for in much greater numbers than shown. In any event, this embodiment shows vortex generators 853 on the suction side 801 only in the area between the first and second wing fences 810 or 820, respectively. This means that vortex generators 854 are also provided for on the pressure side 802, which may be also arranged outside the area between the two wing fences 810 and 820 towards the blade root 807.

Figure 11:
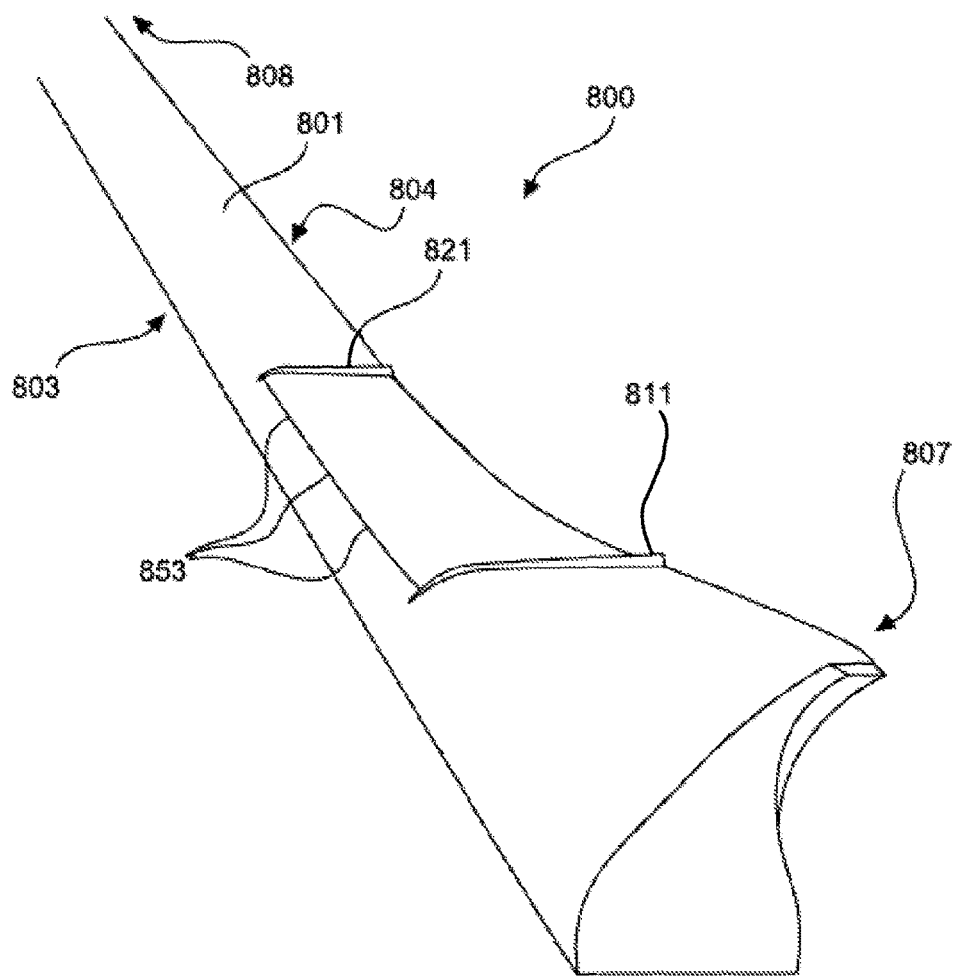
FIG. 11 shows a perspective view of one part of the rotor blade.

The perspective illustration of FIG. 11 basically shows a detail of the rotor blade 800, which essentially shows the suction side 801 of the rotor blade 800. What can be seen here is the position and configuration of the wing fence sections 811 and 821 on the suction side. What can be also seen is the arrangement of the vortex generators 853 between said fence sections 811 and 821. The wing fences or fence sections 821 and 811, respectively, become smaller towards the rotor blade nose 803 and bigger towards the rear edge 804, showing a greater height than towards the rotor blade nose 803.

The wing fences are preferably applied in a blade section plane that is at an angle of 90° to the longitudinal axis of the rotor blade. A deviation therefrom caused by production shall not exceed a tolerance angle of 2° to 5°, so that the trailing edge of the wing fences—i.e., the area pointing towards the blade rear edge—is not twisted in the direction of the hub more than said tolerance angle.

Figure 12:
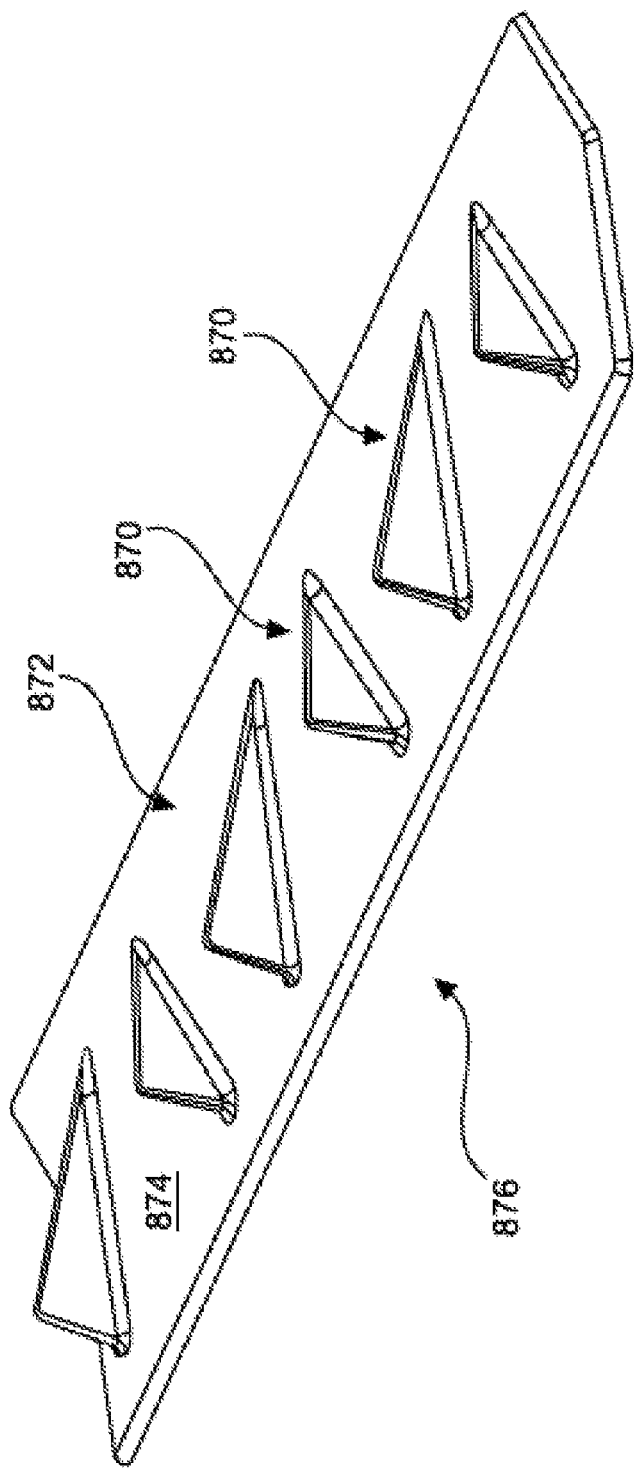
FIG. 12 shows the exemplary perspective view of some vortex generators.

FIG. 12 shows a perspective view of some vortex generators 870. One angle of incidence is drawn in schematically in form of an arrow 872. The vortex generators are designed, for example, as triangles with a flat body, which is arranged vertically to the blade surface 874 and at a bias to the angle of incidence 872, and thus at a bias to the rotor blade's direction of movement, with the tilted position alternating from one vortex generator 870 to the next. The vortex generators thus have an alternating tilted position to the wind's angle of incidence. Moreover, the vortex generators resemble, for example, a shark fin in terms of their nature and direction, namely a dorsal shark fin, except that the shark fin is not at a bias to the angle of incidence. The vortex generators 870 may be applied to the rotor blade surface as a vortex generator bar 876.

What is also described hereinafter are preferred embodiments of a rotor blade that—as described above in connection with other embodiments—may feature two wing fences and, optionally, vortex generators, as described.

Embodiment 1:

A rotor blade (1) of a wind turbine, having:
  a rotor blade root (4) for connecting the rotor blade (1) to a rotor hub and
  a rotor blade tip that is arranged at the side facing away from the rotor blade root (4),
  wherein a relative profile thickness (2), which is defined as the profile thickness (2) to profile depth (3) ratio, shows a local maximum in a central area (6) between rotor blade root and rotor blade tip.

Embodiment 2:

A rotor blade (1) according to embodiment 1, wherein the relative profile thickness (2) of the local maximum is 35% to 50%, in particular 40% to 45%.

Embodiment 3:

A rotor blade (1) according to one of the embodiments 1 or 2, wherein the rotor blade (1) has a profile depth of 1500 mm to 3500 mm, in particular about 2000 mm, in the area of the local maximum.

Embodiment 4:

A rotor blade (1) according to one of the above embodiments,
  wherein the rotor blade (1) is designed for a tip speed ratio in a range between 8 and 11, preferably between 9 and 10.

Embodiment 5:

A rotor blade (1) according to one of the above embodiments,
  wherein the rotor blade (1) features in a range of 90% to 95% of the total length of the rotor blade, as measured from the rotor blade root to the rotor blade tip, a profile depth (3) that equals about 5% to 15%, in particular about 10%, of the profile depth (3) in the area of the rotor blade root (4), and/or
  that the rotor blade shows a linear thickness profile from 5% to 25% of the total length of the rotor blade, preferably from 5% to 35%, in particular from the rotor blade root to the central area.

Embodiment 6:

A rotor blade (1) according to one of the above embodiments,
  wherein the rotor blade (1) has a profile depth (3) of at least 3900 mm at the rotor blade root (4), in particular in a range of 3000 mm to 8000 mm, and/or a profile depth (3) of not more than 1000 mm, in particular in a range of 700 mm to 300 mm, in the range of 90% to 95% of the total length, in particular at 90%, based on the rotor blade root (4).

Embodiment 7:

A rotor blade (1) according to one of the above embodiments,
  wherein the rotor blade (1) has a profile depth in the central area that equals about 20% to 30%, in particular about 25%, of the profile depth in the area of the rotor blade root (4).

The invention claimed is:

1. A rotor blade of an aerodynamic rotor of a wind turbine comprising:
  a first wing fence and a second wing fence, wherein: the first wing fence is arranged at the rotor blade in a radial direction, in relation to an axis of rotation of the rotor, in a range of 25% to 40% along a length of the rotor blade measured from a root of the rotor blade; and the second wing fence is arranged at the rotor blade in the radial direction, in relation to the axis of rotation of the rotor, in a range of 45% to 60% along a length of the rotor blade measured from the root of the rotor blade, wherein the first wing fence has a first mean height and the second wing fence has a second mean height, wherein the first mean height is greater than the second mean height.

2. The rotor blade according to claim 1, wherein:
  the first wing fence is arranged at the rotor blade in the radial direction, in relation to the axis of rotation of the rotor, in a range of 30% to 35% along the length of the rotor blade measured from the root of the rotor blade; and
  the second wing fence is arranged at the rotor blade in the radial direction, in relation to the axis of rotation of the rotor, in a range of 50% to 55% along the length of the rotor blade measured from the root of the rotor blade.

3. The rotor blade according to claim 1, wherein: the first and the second wing fences are arranged at a suction side of the rotor blade; or the first and the second wing fences each include fence sections at the suction side and at a pressure side, respectively, of the rotor blade.

4. The rotor blade according to claim 1, wherein each wing fence is designed as a bridge having: a base section, and a rear section, wherein the base section has a shape that corresponds to a surface of the rotor blade, and wherein the rear section has a contour line that corresponds to the surface of the rotor blade.

5. The rotor blade according to claim 1, wherein the first and second mean heights equal a thickness of a boundary layer of air blowing against the rotor blade.

6. The rotor blade according to claim 5, wherein the first and second mean heights are two to five times higher than the boundary layer of air blowing against the rotor blade.

7. The rotor blade according to claim 1, further comprising vortex generators arranged on a suction side of the rotor blade proximate a blade nose of the rotor blade and between the first and second wing fences.

8. The rotor blade according to claim 1, wherein the rotor blade has a profile depth that is greatest at a blade root for attaching to a rotor hub of the aerodynamic rotor.

9. A wind turbine comprising:
  a plurality of rotor blades according to claim 1.

10. The rotor blade according to claim 1, wherein the first mean height is 5 mm or less and the second mean height is 15 mm or greater.

11. The rotor blade according to claim 1, wherein the first mean height of the first wing fence is at least 30% greater than the second mean height of the second wing fence.

12. The rotor blade according to claim 1, further comprising vortex generators between the first and second wing fences.

13. The rotor blade according to claim 1, further comprising:

a blade nose pointing in the direction of movement of the rotor blade; and a rear edge facing away from the blade nose.

* * * * *